United States Patent
Park (10) Patent No.: US 7,596,157 B2
(45) Date of Patent: Sep. 29, 2009

(54) LASER OPTICAL APPARATUS

(75) Inventor: Chan Young Park, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 159 days.

(21) Appl. No.: 11/326,428

(22) Filed: Jan. 6, 2006

(65) Prior Publication Data
US 2006/0146896 A1 Jul. 6, 2006

(30) Foreign Application Priority Data
Jan. 6, 2005 (KR) .................. 10-2005-0001107

(51) Int. Cl.
*H01S 3/10* (2006.01)
(52) U.S. Cl. .................... 372/29.023; 385/37
(58) Field of Classification Search ............ 385/3, 385/49, 54; 372/21, 40, 10, 6
See application file for complete search history.

(56) References Cited

U.S. PATENT DOCUMENTS

| | | | | |
|---|---|---|---|---|
| 4,963,832 | A * | 10/1990 | Desurvire et al. | 359/341.41 |
| 5,115,338 | A * | 5/1992 | DiGiovanni et al. | 359/337 |
| 5,185,826 | A * | 2/1993 | Delavaux | 385/24 |
| 5,369,661 | A * | 11/1994 | Yamaguchi et al. | 372/69 |
| 5,463,708 | A * | 10/1995 | Yui et al. | 385/49 |
| 5,907,645 | A * | 5/1999 | Dupont et al. | 385/3 |
| 5,930,029 | A * | 7/1999 | Mehuys | 359/341.33 |
| 5,933,271 | A * | 8/1999 | Waarts et al. | 359/341.31 |
| 6,084,992 | A * | 7/2000 | Weber et al. | 385/24 |
| 6,122,419 | A * | 9/2000 | Kurokawa et al. | 385/31 |
| 6,212,310 | B1 * | 4/2001 | Waarts et al. | 385/24 |
| 6,222,963 | B1 * | 4/2001 | Grand et al. | 385/39 |
| 6,272,155 | B1 * | 8/2001 | Sekiguchi | 372/6 |
| 6,297,903 | B1 * | 10/2001 | Grubb et al. | 359/341.3 |
| 6,339,664 | B1 * | 1/2002 | Farjady et al. | 385/37 |
| 6,434,295 | B1 * | 8/2002 | MacCormack et al. | 385/27 |
| 6,718,096 | B2 * | 4/2004 | Sasaki | 385/43 |
| 6,760,521 | B2 * | 7/2004 | Watanabe | 385/50 |
| 6,909,833 | B2 * | 6/2005 | Henschel et al. | 385/135 |

\* cited by examiner

*Primary Examiner*—Minsun Harvey
*Assistant Examiner*—Tuan N. Nguyen
(74) *Attorney, Agent, or Firm*—Birch, Stewart, Kolasch & Birch, LLP (57) ABSTRACT

A laser optical apparatus which removes speckles from a screen by changing the phase of a laser beam so as to form an image having high visibility. The laser optical apparatus includes an incident unit on which a laser beam is incident; a multichannel connector having at least two channels having different distances of a route of the laser beam incident on the incident unit so that channels emit beams having different phases; and an exit unit from which the laser beam having a phase changed by the multichannel connector is emitted.

11 Claims, 5 Drawing Sheets

LASER OPTICAL APPARATUS

This application claims the benefit of Korean Patent Application No. 10-2005-0001107, filed on Jan. 6, 2005, which is hereby incorporated by reference as if fully set forth herein.

BACKGROUND OF THE INVENTION

1. Field of the Invention

The present invention relates to a laser optical apparatus, and more particularly, to a laser optical apparatus, which removes speckles from a screen and improves light efficiency so as to display a bright and clear image having excellent picture quality.

2. Discussion of the Related Art

Generally, display units have been developed towards light-weight, thin and large-screen trends, and been pursued to display an image having high-luminance, high-definition, and high-contrast.

Due to the recent development of a projection display technique, there have been significant developments towards high-luminance and high-contrast characteristics of display units. Particularly, a projection display unit for displaying an image on a large-sized screen by enlarging the image using a display system for forming the large-sized screen has been proposed.

Figure 1:
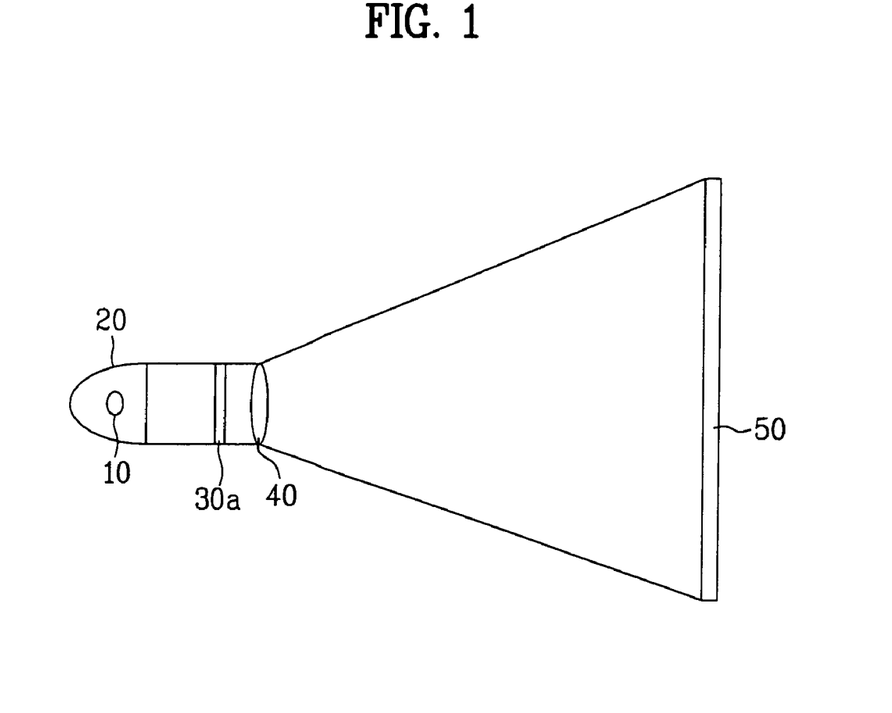
FIG. 1 is a schematic view of a conventional lamp projection display unit.

FIG. 1 illustrates a projection display unit using a lamp as a light source. As shown in FIG. 1, light emitted from a lamp 10 is concentrated on one side by a reflecting mirror 20, and the light concentrated by the reflecting mirror 20 is irradiated onto an image display unit, such as an LCD panel 30a. The LCD panel 30a adjusts transmittance of the light, thereby displaying an image. The image is enlarged and projected by a projection unit 40, and is formed on a screen 50. A user at the front or rear side of the screen 50 sees the image formed on screen 50.

Conventionally, a lamp was used as the light source of the above projection display unit. Recently, a laser projection display unit using a laser as a light source has been developed.

The laser projection display unit using the laser as the light source is advantageous in that an obtained image is clear and has a broad range of nearly solid colors. Further, the obtained image of laser projection display unit has a high contrast, thereby being clear.

Figure 2:
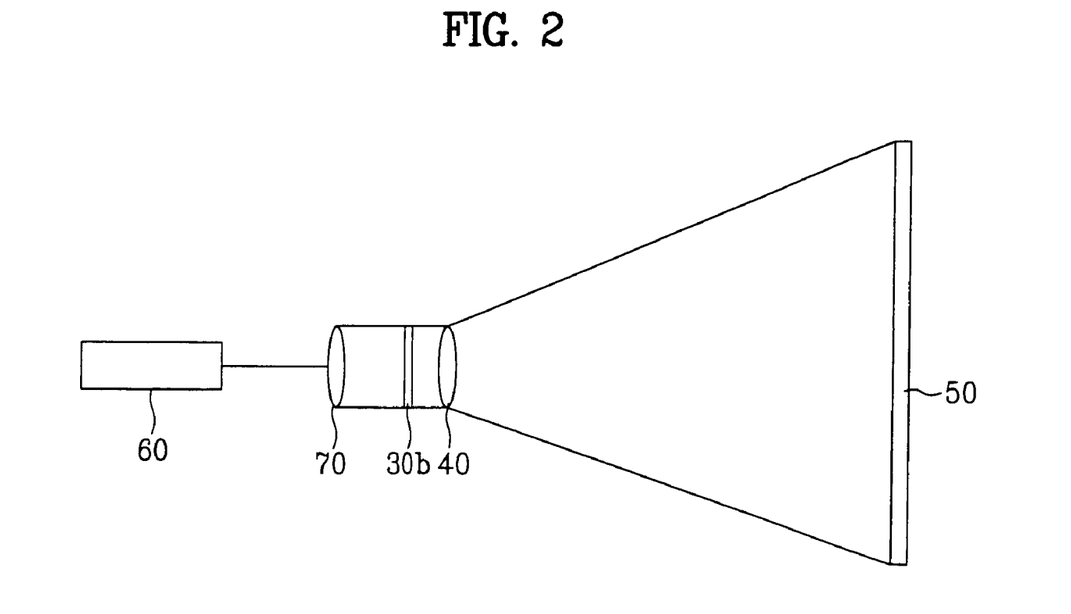
FIGS. 2 and 3 are respectively schematic views of conventional laser projection display units.
Figure 3:
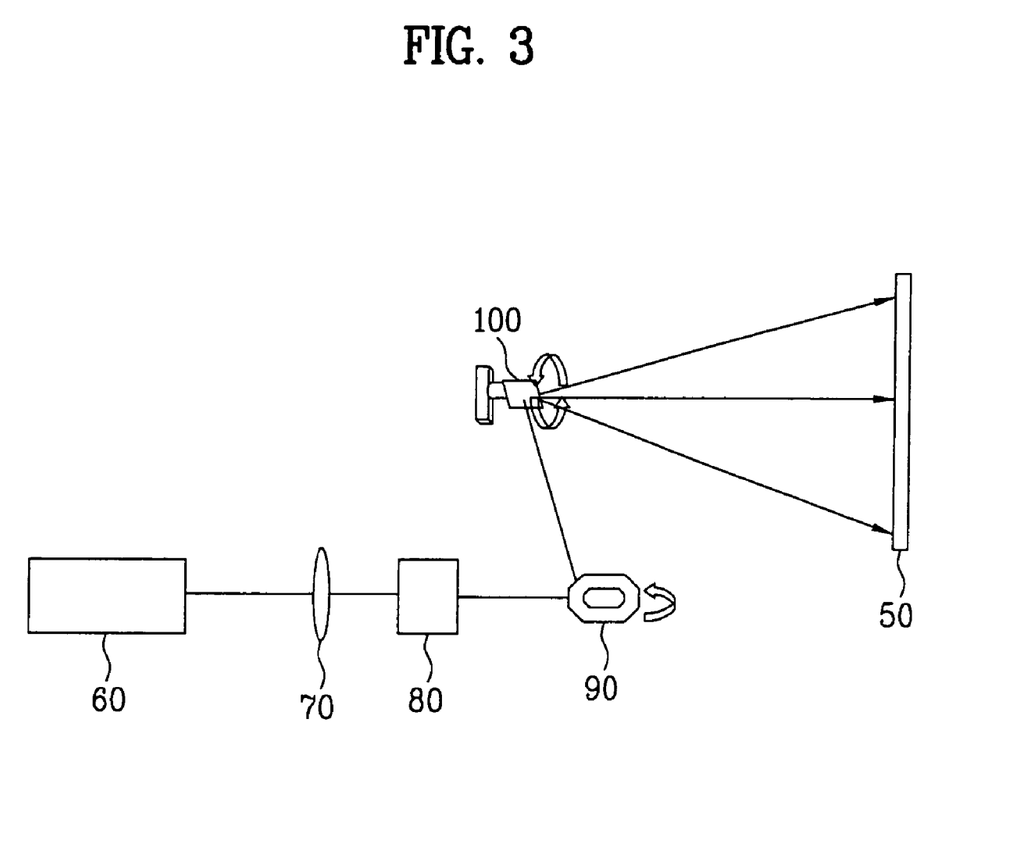

FIGS. 2 and 3 respectively illustrate laser projection display units using a laser as a light source.

As shown in FIG. 2, a laser projection display unit uses a laser 60 instead of the lamp as a light source. An illuminating unit 70 irradiates a laser beam emitted from the laser 60 on a display panel 30b. The display panel 30b adjusts the quantity of the beam according to an electric signal, and displays an image. An image projecting unit 40 projects the image on a screen 50 so that the image is enlarged and displayed on the screen 50.

As shown in FIG. 3, another laser projection display unit uses the laser 60 as a light source. The illuminating unit 70 concentrate a laser beam emitted from the laser 60 on an Acoustic Optic Modulator (AOM) 80. The AOM 80 adjusts the quantity of the transmitted beam according to an electric signal in connection with an image signal.

The laser beam adjusted by the AOM 80 travels to a polygonal mirror 90. Here, the polygonal mirror 90 rotates, thus forming a horizontal image.

The beam reflected by the polygonal mirror 90 travels to a galvanometer 100. Here, the galvanometer 100 repeatedly moves up and down throughout a designated range of angles, thus forming a vertical image.

That is, the image is displayed on the screen 50 by scanning the laser beam through the combination of the rotation of the polygonal mirror 90 and the movement of the galvanometer 100 throughout the designated range of angles.

Since the above laser projection display unit uses the laser, it is possible to increase the visibility of colors, thereby being capable of displaying an image having colors close to natural colors. Further, it is possible to increase of contrast of colors, thereby increasing a picture quality.

Due to coherence, one of characteristics of the laser, the laser projection display unit generates interference of the laser on the screen, thereby generating speckles on the screen. These speckles deteriorate a picture quality, thus lowering the contrast and resolution of the image.

That is, the laser projection display unit displays an image having high visibility and excellent picture quality, but may deteriorate the contrast and resolution of the image due to the characteristics of the laser.

SUMMARY OF THE INVENTION

Accordingly, the present invention is directed to a laser optical apparatus that substantially obviates one or more problems due to limitations and disadvantages of the related art.

An object of the present invention is to provide a laser optical apparatus, which removes speckles from a projection screen so as to improve light efficiency.

Another object of the present invention is to provide a laser optical apparatus, which displays an image having high brightness and visibility and excellent picture quality.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a laser optical apparatus comprises an incident unit on which a laser beam is incident; a multichannel connector having at least two channels having different distances of a route of the laser beam incident on the incident unit so that channels emit beams having different phases; and an exit unit from which the laser beam having a phase changed by the multichannel connector is emitted.

In another aspect of the present invention, the incident unit comprises a first optical fiber, the exit unit comprises a second optical fiber, and the multichannel connector comprises at least two fine optical fibers having different distances for connecting the first optical fiber and the second optical fiber.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 5 to 7 are schematic views of embodiments of a multichannel connector of the laser optical apparatus in accordance with the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 4:
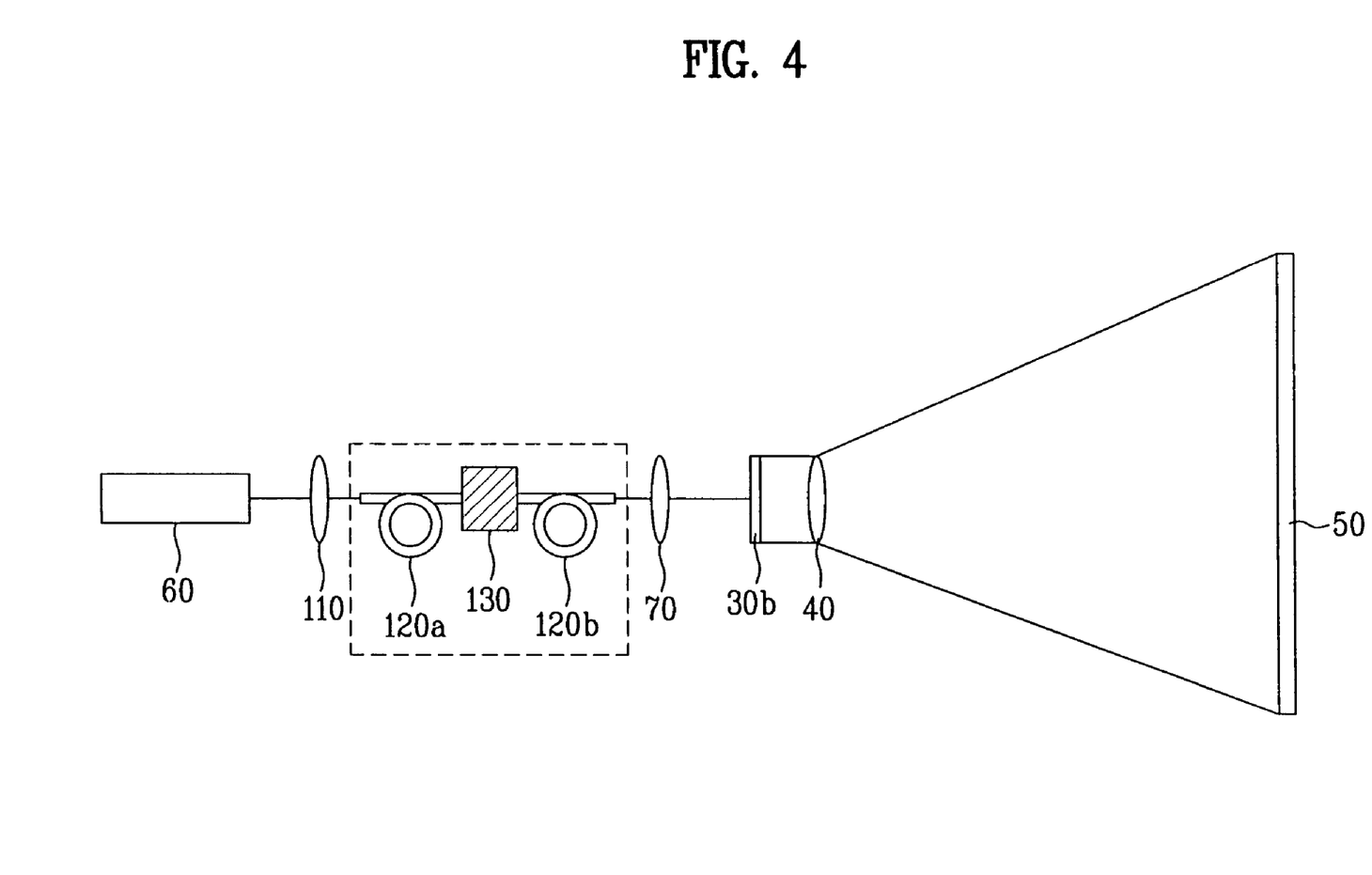
FIG. 4 is a schematic view of a laser optical apparatus in accordance with the present invention.

FIG. 4 is a schematic view of a laser optical apparatus using a laser as a light source in accordance with the present invention.

As shown in FIG. 4, the laser optical apparatus of the present invention comprises an incident unit 120a on which a laser beam is incident, a multichannel connector 130 having at least two channels having different distances of a route of the laser beam incident on the incident unit 120a so that the channels emit beams having different phases, and an exit unit 120b from which the laser beam having the phase changed by the multichannel connector 130 is emitted.

More particularly, the laser optical apparatus of the present invention further comprises a laser beam source 60, a focusing unit 110 for focusing the laser beam emitted from the laser beam source 60, the multichannel connector 130 for changing the phase of the beam focused by the focusing unit 110, an illuminating unit 70 for focusing the beam emitted from the multichannel connector 130 and irradiating the beam with designated dimensions at a specific magnification, a display unit 30b for displaying an image using the beam emitted from the illuminating unit 70 according to an electric signal, and a projecting unit 40 for projecting the image displayed by the display unit 30b on a screen 50.

The incident unit 120a comprises a first optical fiber, and the exit unit 120b comprises a second optical fiber. The multichannel connector 130 comprises at least two fine optical fibers 140 having different distances for connecting the first optical fiber and the second optical fiber.

The multichannel connector 130 further comprises a fixing unit 145 for fixing the fine optical fibers 140. The fixing unit 145 is made of a transparent crystalline material. That is, the fixing unit 145 has an optical crystalline structure similar to that of quartz.

FIG. 5 illustrates a first embodiment of the multichannel connector 130.

With reference to FIG. 5, the first embodiment of the multichannel connector 130 comprises at least two first fine optical fibers 141a having different lengths connected to the first optical fiber of the incident unit 120a, and at least two second fine optical fibers 141b having different lengths spaced from the first fine optical fibers 141a by a constant interval and connected to the second optical fiber of the exit unit 120b. That is, the beam emitted from the laser beam source 60 is inputted to the first optical fiber of the incident unit 120a, is transmitted from the first fine optical fibers 141a to the second fine optical fibers 141b, and is then transmitted to the second optical fiber of the exit unit 120b. Here, the first fine optical fibers 141a are separated from the second fine optical fibers 141b by the constant interval.

The fixing unit 145 of the multichannel connector 130 serves to fix the separated first and second fine optical fibers 141a and 141b.

A plurality of the first fine optical fibers 141a have different lengths, and a plurality of the second fine optical fibers 141b have different lengths. The first fine optical fibers 141a having different lengths are separated from the second fine optical fibers 141b having different lengths by the same interval. Thus, the first fine optical fibers 141a transmit beams having changed phases to the second fine optical fibers 141b.

Here, the beam passing through the first optical fiber of the incident unit 120a is divided into a plurality of the first and second fine optical fibers 141a and 141b. Since the first and second fine optical fibers 141a and 141b have different lengths, the phases of the beams emitted from the second fine optical fibers 141b are different.

The first optical fiber of the incident unit 120a and the second optical fiber of the exit unit 120b have a diameter of 1 mm~3 mm, and the first fine optical fibers 141a and the second fine optical fibers 141b have a diameter of 20 µm~80 µm. Accordingly, preferably, 13 to 21 first and second fine optical fibers 141a and 141b are respectively connected to the first and second optical fibers of the incident and exit units 120a and 120b.

At least two first fine optical fibers 141a and at least two second fine optical fibers 141b are bonded by an adhesive, such as epoxy. Such a bonding method is generally used, and a detailed description thereof will be thus omitted.

The fixing unit 145 fixes the first and second fine optical fibers 141a and 141b under the condition that the first fine optical fibers 141a are separated from the second fine optical fibers 141b by the same interval. The fixing unit 145 is made of a transparent crystalline material, thus minimizing the deterioration in light efficiency.

Figure 6:
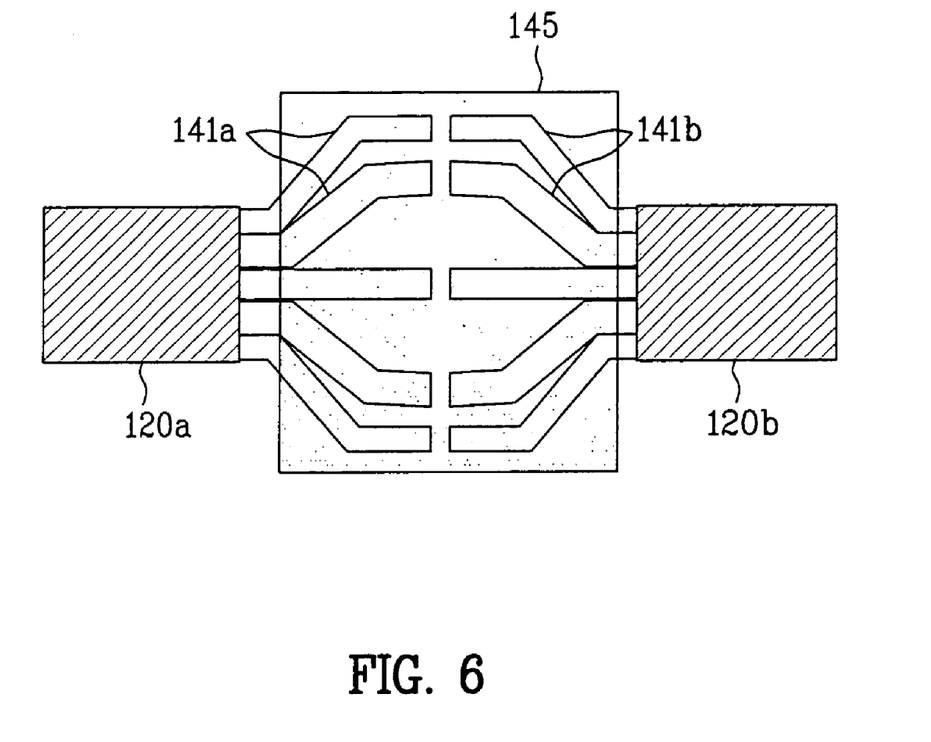

FIG. 6 illustrates a second embodiment of the multichannel connector 130.

With reference to FIG. 6, the second embodiment of the multichannel connector 130 comprises at least two fine optical fibers 142 having different lengths, one ends of which are connected to the first optical fiber of the incident unit 120a so as to receive the beam from the first optical fiber, and the other ends of which are connected to the second optical fiber of the exit unit 120b so as to emit the beam to the second optical fiber.

The second embodiment of the multichannel connector 130 is different from the first embodiment of the multichannel connector 130 in that the fine optical fibers 142 of the second embodiment of the multichannel connector 130 are not cut. That is, the laser beam emitted from the first optical fiber of the incident unit 120a passes through the plural fine optical fibers 142 so that the laser beam is divided into beams having different phases, and the beams having different phases are transmitted to the second optical fiber of the exit unit 120b.

Here, the beam passing through the first optical fiber of the incident unit 120a is divided into routes towards the plural fine optical fibers 142. Since the fine optical fibers 142 have different lengths, the phases of the beams emitted from the fine optical fibers 142 are different.

The first optical fiber of the incident unit 120a and the second optical fiber of the exit unit 120b have a diameter of 1 mm~3 mm, and the fine optical fibers 142 have a diameter of 20 µm~80 µm. Accordingly, preferably, 13 to 21 fine optical fibers 142 are respectively connected to the first and second optical fibers of the incident and exit units 120a and 120b.

The fixing unit 145 fixes the fine optical fibers 142, which are not cut. The fixing unit 145 is made of a transparent crystalline material, thus minimizing the deterioration in light efficiency.

Figure 7:
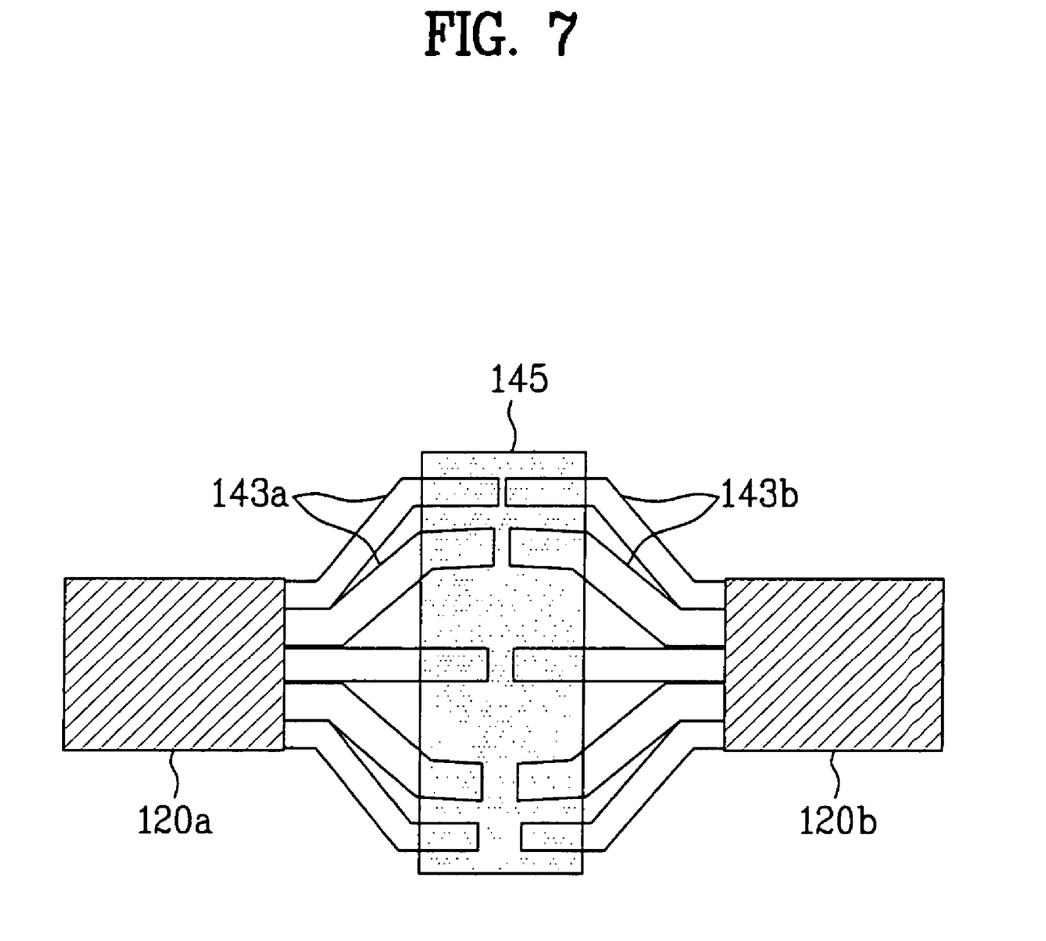

FIG. 7 illustrates a third embodiment of the multichannel connector 130.

With reference to FIG. 7, the third embodiment of the multichannel connector 130 comprises at least two first fine optical fibers 143a connected to the first optical fiber of the incident unit 120a, and at least two second fine optical fibers 143b connected to the second optical fiber of the exit unit 120b and spaced from the first fine optical fibers 143a by at least two different intervals. That is, the intervals between the first fine optical fibers 143a and the second fine optical fibers 143b are different, thereby generating a difference of the distances of the first and second fine optical fibers 143a and 143b and thus differentiating phases of the beam.

The third embodiment of the multichannel connector 130 is different from the first embodiment of the multichannel connector 130 in that the first fine optical fibers 143a are separated from the second fine optical fibers 143b by at least two different intervals.

Differing from the first and second fine optical fibers 141a and 141b of the first embodiment, the first and second fine optical fibers 143a and 143b of the third embodiment may have the same length or different lengths.

That is, the first or second fine optical fibers 143a or 143b may have different lengths, or the first and second fine optical fibers 143a and 143b may have different lengths. Since the intervals between the first fine optical fibers 143a and the second fine optical fibers 143b are different, phases of the emitted beam are different. Additionally, the phases of the beam are differentiated by allowing the beam to pass through the first or second fine optical fibers 143a and 143b having different lengths.

Here, the beam passing through the first optical fiber of the incident unit 120a is divided into the first and second fine optical fibers 143a and 143b. The phases of the beam may be differentiated by different intervals between first and second fine optical fibers 143a and 143b. Further, the phases of the beam may be differentiated by different lengths of the first and second fine optical fibers 143a and 143b and by different intervals between first and second fine optical fibers 143a and 143b.

The first optical fiber of the incident unit 120a and the second optical fiber of the exit unit 120b have a diameter of 1 mm~3 mm, and the first fine optical fibers 143a and the second fine optical fibers 143b have a diameter of 20 μm~80 μm. Accordingly, preferably, 13 to 21 first and second fine optical fibers 143a and 143b are respectively connected to the first and second optical fibers of the incident and exit units 120a and 120b.

At least two first fine optical fibers 143a and at least two second fine optical fibers 143b are bonded by an adhesive, such as epoxy. Such a bonding method is generally used, and a detailed description thereof will be thus omitted.

The fixing unit 145 fixes the first and second fine optical fibers 143a and 143b under the condition that the first fine optical fibers 143a are separated from the second fine optical fibers 143b by different intervals. The fixing unit 145 is made of a transparent crystalline material, thus minimizing the deterioration in light efficiency.

That is, when the beam is emitted from the first fine optical fibers 143a and is incident on the second fine optical fibers 143, the distances between the first and second fine optical fibers 143a and 143b fixed by the fixing unit 145 are different, thereby differentiating the phase of the transmitted beam due to characteristics of the laser optical apparatus. The phases of the beam are changed by adjusting the difference of the distances.

The channels of the multichannel connector 130 in accordance with the first to third embodiments emit beams having different phases using a difference of lengths of fine optical fibers and/or a difference of intervals between the fine optical fibers, and joins the beams into the optical fiber of an exit unit, thereby eliminating coherence of the laser.

That is, the laser beam, which is divided by the fine optical fibers of the multichannel connector 130 and then joined, has an irregular phase. Thereby, it is possible to prevent speckles generated by interference due to regular phase of the laser beam.

Hereinafter, the operation of the laser optical apparatus of the present invention will be described.

The laser beam source 60 emits a laser beam. The laser beam source 60 includes three laser beam sources, such as R (Red), G (Green) and B (blue) laser beam sources, so as to form a colored image.

The laser beam is focused by the focusing unit 110, and is incident on the first optical fiber of the incident unit 120a. The beam incident on the first optical fiber of the incident unit 120a passes through the fine optical fibers of the multichannel connector 130 so that beams having different phases are emitted from the channels of the multichannel connector 130 using a difference of distances between the fine optical fibers and are joined into the second optical fiber of the exit unit 120b.

Since the beams having the different phases are joined again, the coherence between the beams is eliminated.

That is, since the laser beam, which was divided by the fine optical fibers of the multichannel connector 130 and joined, has an irregular phase, it is possible to remove speckles generated due to interference caused by the regular phase of the laser beam.

Accordingly, the laser optical apparatus using the multichannel connector 130 does not require an oscillation element for irregularly changing a phase difference of the beam passing through the optical fibers for eliminating speckles.

Further, the laser optical apparatus does not employ an additional optical system, such as a diffuser, thereby having a small optical loss and increasing light efficiency.

As described above, the beams having different phases obtained by the multichannel connector 130 are joined into the second optical fiber of the exit unit 120b, and the joined beam is emitted from the second optical fiber of the exit unit 120b and irradiated onto the display unit 30b by the illuminating unit 70 at a designated magnification.

The display unit 30b adjusts the quantity of the beam according to an external image signal, thereby forming an image.

The image is enlarged and projected by the projecting unit 40, and is formed on the screen 50.

In order to form a colored image, colors are combined using display units corresponding to the R, G and B laser beam sources.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A laser optical apparatus, comprising: a first optical fiber; a second optical fiber;
a plurality of first fine optical fibers having a first end portion and a second end portion, the first end portion of the plurality of first fine optical fibers being coupled to an end portion of the first optical fiber;
a plurality of second fine optical fibers having a first end portion and a second end portion, the first end portion of the plurality of second fine optical fibers being coupled to an end portion of the second optical fiber, the second end portion of the plurality of second fine optical fibers being spaced from the second end portion of the plurality of first fine optical fibers without coupling to the second end portion of the plurality of first fine optical fibers; and
a multichannel connector arranged to fix the plurality of first fine optical fibers and the plurality of second fine optical fibers,
wherein the plurality of first fine optical fibers are symmetrically opposite the corresponding plurality of second fine optical fibers, and
wherein lengths of the plurality of first fine optical fibers are different from one another and lengths of the plurality of second fine optical fibers are different from one another so that the plurality of first fine optical fibers transmit optical beams having changed phases to the plurality of second fine optical fibers;
wherein the multichannel connector includes a fixing unit configured to fix the first and second fine optical fibers, the fixing unit comprising a transparent crystalline material; and
wherein the first optical fiber and the second optical fiber have a diameter of 1 mm-3 mm.

2. The laser optical apparatus as set forth in claim 1, wherein a distance between the second end portion of a first of the plurality of first fine optical fibers and the second end portion of a first of the plurality of second fine optical fibers is substantially equal to a distance between a second end portion of a second of the plurality of first fine optical fibers, adjacent to the first of the plurality of first fine optical fibers, and a second end portion of a second of the plurality of second fine optical fibers, adjacent to the first of the plurality of second fine optical fibers.

3. The laser optical apparatus as set forth in claim 1, wherein a distance between the second end portion of the first fine optical fiber and the second end portion of the second fine optical fiber is substantially different from a distance between a second end portion of a second of the plurality of first fine optical fibers, adjacent to the first of the plurality of first fine optical fibers, and a second end portion of a second of the plurality of second fine optical fibers adjacent to the first of the plurality of second fine optical fibers.

4. The laser optical apparatus as set forth in claim 1, wherein a route of a laser beam passing through the first optical fiber is divided into the plurality of first fine optical fibers.

5. The laser optical apparatus as set forth in claim 1, wherein each of the plurality of first fine optical fibers have a diameter of 20 μm~80 μm.

6. The laser optical apparatus as set forth in claim 1, wherein a number of the plurality of first fine optical fibers and a number of the plurality of second fine optical fibers is 13 to 21.

7. A laser optical apparatus, comprising: a first optical fiber; a second optical fiber; a plurality of first fine optical fibers having a first end portion and a second end portion, the first end portion of the plurality of first fine optical fibers being coupled to an end portion of the first optical fiber;
a plurality of second fine optical fibers having a first end portion and a second end portion, the first end portion of the plurality of second fine optical fibers being coupled to an end portion of the second optical fiber, the second end portion of the plurality of second fine optical fibers being spaced from the second end portion of the plurality of first fine optical fibers without coupling to the second end portion of the plurality of first fine optical fibers; and
a multichannel connector arranged to fix the plurality of first fine optical fibers and the plurality of second fine optical fibers,
wherein the plurality of first fine optical fibers are symmetrically opposite the corresponding plurality of second fine optical fibers,
wherein a distance between the second end portion of the plurality of first fine optical fibers and the second end portion of the plurality of second fine optical fibers is substantially equal to a distance between a second end portion of a second of the plurality of first fine optical fibers, adjacent to the first of the plurality of first fine optical fibers, and a second end portion of a second of the plurality of second fine optical fibers, adjacent to the first of the plurality of second fine optical fibers,
wherein lengths of the plurality of first fine optical fibers are different from one another and lengths of the plurality of second free optical fibers are different from one another so that the plurality of first fine optical fibers transmit beam having changed phases to the plurality of second fine optical fibers;
wherein the multichannel connector includes a fixing unit configured to fix the first and second fine optical fibers, the fixing unit comprising a transparent crystalline material; and
wherein the first optical fiber and the second optical fiber have a diameter of 1 mm-3 mm.

8. The laser optical apparatus as set forth in claim 7, wherein the plurality of first fine optical fibers and the plurality of second fine optical fibers are spaced apart from one another by a common distance.

9. The laser optical apparatus as set forth in claim 7, wherein the plurality of first fine optical fibers and the plurality of second fine optical fibers are spaced apart from one another by different distances.

10. A laser optical apparatus, comprising: a first optical fiber; a second optical fiber; a plurality of first fine optical fibers having a first end portion and a second end portion of the first end portion of the plurality of first fine optical fibers being coupled to an end portion of the first optical fiber;
a plurality of second fine optical fibers having a first end portion and a second end portion, the first end portion of the plurality of second fine optical fibers being coupled to an end portion of the second optical fiber, the second end portion of the plurality of second fine optical fibers being spaced from the second end portion of the plurality of first fine optical fibers without coupling to the second end portion of the plurality of first fine optical fibers; and a multichannel connector arranged to fix the plurality of first fine optical fibers and the plurality of second fine optical fibers, wherein the plurality of first fine optical fibers are symmetrically opposite corresponding plurality of second fine optical fibers, and wherein a distance between the second end portion of the first fine optical fiber and the second end portion of the second fine optical fiber is substantially different from a distance between a second end portion of a second of the plurality of first fine optical fibers, adjacent to the first of the plurality of first fine optical fibers, and a second end portion of a second of the plurality of second fine optical fibers, adjacent to the first of the plurality of second fine optical fibers;

wherein the multichannel connector includes a fixing unit configured to fix the first and second fine optical fibers, the fixing unit comprising a transparent crystalline material; and wherein the first optical fiber and the second optical fiber have a diameter of 1 mm-3 mm.

11. The laser optical apparatus as set forth in claim 10, wherein lengths of the plurality of first fine optical fibers are different from one another and lengths of the plurality of second fine optical fibers are different from one another.

* * * * *